United States Patent

Tokunaga et al.

[11] Patent Number: 6,093,464
[45] Date of Patent: Jul. 25, 2000

[54] PRESSURE-SENSITIVE ADHESIVE COMPOSITION AND PRESSURE-SENSITIVE ADHESIVE SHEETS

[75] Inventors: Yasuyuki Tokunaga; Masahiko Ando; Takeshi Yamanaka; Waka Hikosaka, all of Osaka, Japan

[73] Assignee: Nitto Denko Corporation, Osaka, Japan

[21] Appl. No.: 08/862,261

[22] Filed: May 23, 1997

[30] Foreign Application Priority Data

May 24, 1996 [JP] Japan ................................. 8-129473

[51] Int. Cl.[7] .......................... B32B 27/06; B32B 27/36; C08G 63/08
[52] U.S. Cl. ...................... 428/40.1; 428/41.8; 428/352; 428/354; 428/355 N; 428/480; 428/483; 528/272; 528/354; 528/355; 528/361
[58] Field of Search ..................... 428/352, 354, 428/355 N, 40.1, 41.3, 41.8, 480, 483; 525/330.9, 331.7; 528/272, 354, 355, 361

[56] References Cited

U.S. PATENT DOCUMENTS

| | | | |
|---|---|---|---|
| 2,822,290 | 2/1958 | Webber | 428/352 |
| 3,666,724 | 5/1972 | Hostettler | 528/80 |
| 3,767,040 | 10/1973 | Tushaus | 428/352 |
| 4,052,368 | 10/1977 | Larson | 528/293 |
| 4,096,125 | 6/1978 | Smith et al. | 528/289 |

FOREIGN PATENT DOCUMENTS

| | | |
|---|---|---|
| 0609713 | 8/1994 | European Pat. Off. . |
| 4213214 | 7/1993 | Germany . |
| 4430415 | 3/1996 | Germany . |
| 1338790 | 11/1973 | United Kingdom . |
| WO 9605264 | 2/1996 | WIPO . |

*Primary Examiner*—Paul Thibodeau
*Assistant Examiner*—Ramsey Zacharia
*Attorney, Agent, or Firm*—Sughrue, Mion, Zinn, Macpeak & Seas, PLLC

[57] ABSTRACT

A pressure-sensitive adhesive composition with a pressure-sensitive adhesive property and heat resistance comprises a polyester having a polylactone structure as the main chain. A pressure-sensitive adhesive sheet with a releasing property of a peelable liner and containing no silicone can be obtained by using the pressure-sensitive adhesive composition in combination with a polyolefin film without being subjected to a silicone treatment as a peelable liner. When the pressure-sensitive adhesive sheet comprises a base material having formed thereon the layer of the pressure-sensitive adhesive composition and the back side of the base material has a surface composed of a polyolefin, neither a peelable liner nor a silicone treatment is required. The pressure-sensitive adhesive sheet is suitably used for computer instruments etc., because it contains no silicone.

11 Claims, No Drawings

PRESSURE-SENSITIVE ADHESIVE COMPOSITION AND PRESSURE-SENSITIVE ADHESIVE SHEETS

FIELD OF THE INVENTION

The present invention relates to a polyester series pressure-sensitive adhesive composition and a pressure-sensitive adhesive sheet having the pressure-sensitive adhesive composition which is formed into a sheet, a tape and the like.

BACKGROUND OF THE INVENTION

Polyesters have been developed conventionally as a material excellent in durability and heat resistance for fibers and plastic films. Nowadays, polyesters are also utilized for adhesives taking advantage of the above characteristics. Examples of such an adhesive include a hot melt type adhesive and a heat-curing type adhesive, which contains a curing agent and causes reaction with heat. On the other hand, pressure-sensitive adhesive sheet products having a pressure-sensitive adhesive as the base are utilized in many fields for joining (e.g., fixing of parts), for packing corrugated boards, etc. For the purposes of adhering well and retaining the property, these pressure-sensitive adhesive sheet products are designed to have a high tack (short-time adhesion), a high adhesive force, and a high cohesive force and also to adhere to any various complicated materials.

However, a conventional polyester series adhesive has a far higher melting point (softening point) than room temperature or is in a considerably highly crosslinked state for keeping and giving the adhesive property, and such an adhesive is very hard at about room temperature. Accordingly, it is difficult to utilize the conventional adhesive as a so-called pressure-sensitive adhesive which is required to have a tacking property at about room temperature, that is, a property capable of effecting adhesion by pressing for a short time or lightly.

SUMMARY OF THE INVENTION

An object of the present invention is to utilize a polyester for a pressure-sensitive adhesive under such a circumstance and to provide a polyester series pressure-sensitive adhesive composition excellent in the pressure-sensitive adhesive property and the heat resistance for making further development of pressure-sensitive adhesive compositions.

Also, in most of cases where conventional pressure-sensitive adhesive sheets, which are designed to ensure a good adhesive property to any adherends as described above, are used, a silicone-treated peelable liner having a low adhesive force is used as a peelable liner. In this case, a light peeling force and a good pressure-sensitive adhesive force can be expected but there is a tendency of transferring the silicone onto the surface of the pressure-sensitive adhesive. This causes almost no problem in an ordinary use of the pressure-sensitive adhesive tape, but silicone contained in the pressure-sensitive adhesive tape causes problems in the case where the tape is used for computer instruments, etc. Thus, the development of pressure-sensitive adhesive tapes not having silicone has been desired.

Thus, another object of the present invention is to provide a pressure-sensitive adhesive sheet having an excellent peeling property of the peelable liner and showing a good pressure-sensitive adhesive property by using a peelable liner which is not subjected to a silicone treatment and the pressure-sensitive adhesive composition in combination, and further to provide a pressure-sensitive adhesive sheet which does not require such a peelable liner.

As the result of various investigations for achieving the above-described objects, the present inventors have discovered that a pressure-sensitive adhesive composition showing an excellent pressure-sensitive property and an excellent heat resistance can be obtained by using a polymer having a polylactone structure as the main chain, and that when a film such as a polyethylene film and a polypropylene film is used as a peelable liner which is not subjected to a silicone treatment for the pressure-sensitive adhesive sheet having the layer of the above-described pressure-sensitive composition, a good peeling property can be obtained.

Furthermore, it has been discovered that in the pressure-sensitive adhesive sheet having the pressure-sensitive adhesive composition, when the back surface side of the base material of the pressure-sensitive adhesive sheet is constituted by polyethylene, polypropylene, etc., in place of the use of the peelable liner, a roll-form pressure-sensitive adhesive sheet excellent in the peeling property between the pressure-sensitive adhesive and the back surface can be obtained without subjecting the back surface to a peeling treatment by a silicone treatment.

That is, the first aspect of the present invention is a pressure-sensitive adhesive composition comprising a polymer having a polylactone structure comprising an unit represented by following formula repeatedly as the main chain:

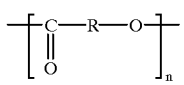

wherein R represents a straight chain or branched hydrocarbon group having from 3 to 15 carbon atoms and n is selected from appropriate repeating numbers such that the weight average molecular weight of the whole polymer becomes at least 10,000.

The second aspect of the present invention is a pressure-sensitive adhesive sheet having the layer composed of the pressure-sensitive adhesive composition of the first aspect.

The third aspect of the present invention is an embodiment of the above-described pressure-sensitive adhesive sheet having stuck to the pressure-sensitive adhesive surface a peelable liner which is not subjected to a silicone treatment. In this embodiment, it is preferred that the peelable liner which is not subjected to a silicone treatment is a polyolefin series film such as polyethylene, polypropylene, an ethylene-polypropylene copolymer or a mixture thereof or a film of which surface is composed of such a polyolefin, and the peeling force of the peelable liner is 200 g/50 mm-width or lower.

Furthermore, the fourth aspect of the present invention is another embodiment of the pressure-sensitive adhesive sheet of the second aspect, wherein the pressure-sensitive adhesive sheet has on one surface of the base material a layer of the pressure-sensitive adhesive composition, the back surface of the base material is not subjected to a silicone treatment, and the pressure-sensitive adhesive sheet is rolled in a roll-form without using a peelable liner. In the embodiment, it is preferred that at least the back surface side of the base material of the pressure-sensitive adhesive sheet is constituted by a polyolefin such as polyethylene, polypropylene, an ethylene-propylene copolymer or a mixture of them.

DETAILED DESCRIPTION OF THE INVENTION

The present invention is described in detail below.

The polymer having the polylactone structure as the main chain, which is used in the present invention, is the polymer having the polylactone structure represented by the above-described formula, wherein R is a straight-chain or branched hydrocarbon group having from 3 to 15 carbon atoms and n is selected from appropriate repeating numbers such that the weight average molecular weight of the whole polymer becomes at least 10,000, preferably 30,000, and more preferably 50,000, with the preferred upper limit being 300,000. If the weight average molecular weight of the polymer is less than 10,000, in a pressure-sensitive adhesive prepared by crosslinking the polymer, the resulting low intercrosslinked molecular weight may remarkably increase the modulus of elasticity, and the low molecular weight of the non-crosslinked portion may adversely affect and reduce the heat resistance, thereby making it hard to take the balance of the pressure-sensitive adhesive characteristics.

As such a polymer, a polyester having a polycaprolactone structure is particularly preferably used. In the polyesters, a polyester synthesized from a diol component indispensably composed of polycaprolactonediol or the derivative thereof and a dicarboxylic acid component indispensably composed of a dicarboxylic acid having an aliphatic or alicyclic hydrocarbon group having from 2 to 20 carbon atoms as the molecular skeleton or the derivative thereof is most preferred.

Polycaprolactonediol is a diol of an oligomer having the repeating unit of caprolactone. The number average molecular weight of the diol is usually 400 or more, and preferably from 500 to 10,000. If the molecular weight is too low, the structure of the synthesized polyester can be complicatedly controlled but there is a fault that the molecular weight is reluctant to increase owing to the synthesis from the low molecular weight.

Commercially available products of polycaprolactonediol include, for example, PLACCEL L205AL, PLACCEL L208AL, PLACCEL L212AL, PLACCEL L220AL, PLACCEL L220PL, PLACCEL 220PM, and PLACCEL L230AL (trade names, made by DAICEL CHEMICAL INDUSTRIES, LTD.).

As the diol component, a mixture of the above-described oligomer component and at least one of ethylene glycol, propylene glycol, butanediol, hexanediol, octanediol, decanediol, octadecanediol, etc.; an oligomer diol such as polycarbonate diol, etc., for example, PLACCEL CD205PL, PLACCEL CD208PL, PLACCEL CD210PL, PLCCEL CD220PL, PLACCEL CD205HL, PLACCEL CD208UL, PLACCEL CD210HL, PLACCEL CD220HL, PLACCEL CD205, PLACCEL CD208, PLACCEL CD210, and PLACCEL CD220 (trade names made by DAICEL CHEMICAL INDUSTRIES, LTD.); and various kinds of blanched diols may be used.

It is preferred that the amount of the other diol is 50% by weight or lower, and more preferably 30% by weight or lower of the amounts of the total diol components. In addition, for increasing the molecular weight of the polymer, a small amount of a 3-functional or more polyol may be added.

On the other hand, in the dicarboxylic acid having the aliphatic or alicyclic hydrocarbon group having from 2 to 20 carbon atoms as the molecular skeleton, the above-described hydrocarbon group may be straight-chain or branched. Examples thereof include succinic acid, methylsuccinic acid, adipic acid, pimelic acid, azelaic acid, sebacic acid, 1,12-dodecanoic di-acid, 1,14-tetradecanoic di-acid, tetrahydrophthalic acid, endomethylenetetrahydrophthalic acid, etc., and the acid anhydride and the lower alkyl esters of them, etc.

It is preferred that as the dicarboxylic acid component, the above-described dicarboxylic acids each having the aliphatic or alicyclic hydrocarbon group having from 2 to 20 carbon atoms as the molecular skeleton are used singly or as a mixture thereof, but as the case may be, a dicarboxylic acid having an aromatic hydrocarbon group as the molecular skeleton may be appropriately mixed with the aforesaid dicarboxylic acid(s). It is preferred that the amount of the dicarboxylic acid having an aromatic hydrocarbon group as the molecular skeleton is 50% by weight or lower, and more preferably 30% by weight or lower of the amount of the total dicarboxylic acid components. In addition, for increasing the molecular weight of the polymer, a small amount of a 3-functional or more and poly-valent carboxylic acid component can be also added.

The polyester is synthesized by the esterification reaction of the above-described diol component and the dicarboxylic acid component. The esterification reaction can be carried out with no catalyst or using an appropriate catalyst according to an ordinary method. In this case, the equimolar reaction of the diol component and the dicarboxylic acid component is desirable but for accelerating the esterification reaction, either of the components may be excessively used in the reaction.

The polymer having a polylactone structure such as the above-described polyester may be crosslinked by an appropriate crosslinking means to provide a pressure-sensitive adhesive composition excellent in pressure-sensitive adhesive property and heat resistance. For the crosslinking, any arbitrary means can be utilized, but general examples thereof include a method which comprises reacting the above-described polymer (the hydroxy group and carboxyl group contained therein) with a polyfunctional compound (e.g., a polyisocyanate compound, an epoxy compound, an aziridine compound, a metal chelate compound, and a metal alkoxide compound). As the polyfunctional compound, a polyisocyanate compound is preferred.

The polyisocyanate compounds include lower aliphatic polyisocyantes such as ethylene diisocyanate, butylene diisocyanate, and hexamethylene diisocyanate; alicyclic polyisocyanates such as cyclopentylene diisocyanate, cyclohexylene diisocyanate, and isophorone diisocyanate; and aromatic polyisocyanates such as 2,4-tolylene diisocyanate, 4,4'-diphenylmethane diisocyanate, and xylylene diisocyanate.

Besides the above-described polyisocyanate compounds, isocyanate addition products such as the tolylene diisocyanate addition product of trimethylolpropane (Coronate L, trade name, made by NIPPON POLYURETHANE INDUSTRY CO., LTD.), the hexamethylene diisocyanate addition product of trimethylolpropane (Coronate HL, trade name, made by NIPPON POLYURETHANE INDUSTRY CO., LTD.), etc., are also used.

These polyfunctional compounds are used singly or as a mixture thereof. The amount of the polyfunctional compound is appropriately selected depending on the balance with the polymer to be crosslinked and the application of the pressure-sensitive adhesive composition. Usually, the crosslinking treatment is effected by compounding the polyfunctional compound in an amount of at least 0.5 part by weight, and preferably from 1 to 5 parts by weight per 100 parts by weight of the polymer. As a result, the pressure-sensitive adhesive composition wherein the solvent-insoluble component ratio of the above-described polymer becomes at least 10% by weight (usually up to 90% by weight), preferably from 15 to 80% by weight, and more preferably from 20 to 70% by weight can be obtained. If the solvent-insoluble component ratio of the polymer is too small, the coercive force of the pressure-sensitive adhesive obtained is liable to be deficient, whereby sufficient modulus of elasticity, heat resistance, and durability can not be obtained. The measurement of the solvent-insoluble component ratio can be effected according to the method in the working examples described later.

As other crosslinking means, there is a method which comprises compounding the polymer with a polyfunctional monomer as a crosslinking agent and crosslinking the polymer with electron rays, etc. The polyfunctional monomers which are used for the above crosslinking reaction include ethylene glycol di(meth)acrylate, pentaerythritol tri(meth) acrylate, tetramethylolmethane tetra(meth)acrylate, trimethylolpropane tri(meth)acrylate, etc. The amount of the polyfunctional monomer is generally from 1 to 5 parts by weight, and preferably from 2 to 4 parts by weight per 100 parts by weight of the above-described polymer such that the solvent-insoluble component ratio of the polymer after crosslinking becomes the same value as described above.

The pressure-sensitive adhesive composition of the present invention is the composition prepared by using the polymer having the above-described polylactone structure as the base polymer and forming the crosslinked structure of the polymer by the ordinary means as described above and the pressure-sensitive adhesive composition may be compounded with conventionally known various tackifiers and further the composition can optionally contain various kinds of additives such as an inorganic or organic filler, a metal powder, a powder such as a pigment, etc., a granular material, a foil-form material, an antioxidant, a plasticizer, etc.

The pressure-sensitive adhesive sheets of the present invention include the sheets or tapes formed from the pressure-sensitive adhesive composition containing above-described various constituents. That is, the foregoing sheet or tape of the pressure-sensitive adhesive composition has at least the layer composed of the above-described pressure-sensitive adhesive composition. For forming such a sheet or tape of the pressure-sensitive adhesive, the layer composed of the pressure-sensitive adhesive composition is first coated on a peelable liner at a dry thickness of usually from about 10 to 150 μm and, if necessary, a peelable liner is further stuck thereto to form a so-called base material-less double faced pressure-sensitive adhesive sheet. In this case, for improving the pressure-sensitive adhesive characteristics, other pressure-sensitive adhesive(s) can be used to form a multilayer structure.

Also, using a base material made up of a plastic film such as a polyester film, etc,; a porous material such as a paper, a non-woven fabric, etc.; a metal foil, etc., the layer of the above-described pressure-sensitive adhesive composition is formed on the base material such that the dry thickness thereof becomes usually from about 10 to 150 μm on one surface to form the pressure-sensitive adhesive layer on one surface or both surfaces of the base material, and a peelable liner is stuck to the pressure-sensitive adhesive layer, whereby a single faced or double faced pressure-sensitive adhesive sheet having the base material can be obtained. In this case, for improving the pressure-sensitive adhesive characteristics, other pressure-sensitive adhesive(s) can be used to form a multilayer structure.

In the case of preparing the pressure-sensitive adhesive sheet having the base material and the above-described base material-less double faced pressure-sensitive adhesive sheet, the crosslinking treatment of the polymer having the polylactone structure as the main chain can be appropriately carried out during or after the production step of the pressure-sensitive adhesive sheets.

In the pressure-sensitive adhesive sheets of the present invention, as the peelable liner which is stuck to the pressure-sensitive adhesive surface, a peelable liner made up of a polyethylene film, a polypropylene film, etc. which is not subjected to a silicone treatment can be used. That is, in the case of using such a peelable liner, a very good releasing property that the peeling force of the liner becomes 200 g/50 mm-width or lower, preferably 100 g/50 mm-width, and more preferably 50 g/50 mm-width (usually up to 1 g/50 mm-width), and the good pressure-sensitive adhesive force as described above can be maintained.

In the case of an acrylic series pressure-sensitive adhesive and a rubber series pressure-sensitive adhesive, when a polyethylene film or a polypropylene film is used as a peelable liner, the peeling force becomes 500 g/50 mm-width or higher to deteriorate the peeling workability. For this reason, the use of a silicone-treated peelable liner is inevitable.

In the use of the pressure-sensitive adhesive according to the present invention, since the peeling force can be controlled to 200 g/50 mm-width or lower while using a peelable liner not subjected to a silicone treatment, the removal of the liner is easy. Accordingly, the pressure-sensitive adhesive sheet of the present invention, which has a peelable liner not subjected to a silicone treatment, can be handled in the same manner as the use of a conventional pressure-sensitive adhesive tape product having a silicone-treated peelable liner. When a peelable liner not subjected to a silicone treatment is used in place of a silicone-treated peelable liner, the change of the apparatus, the working process, etc. is not needed.

Pressure-sensitive adhesive sheets containing no silicone can be produced by using a polyethylene film, a polypropylene film, etc., as a peelable liner for the pressure-sensitive adhesive sheet of the present invention. Accordingly, the present invention can provide a pressure-sensitive adhesive sheet suitable for computer instruments and the like, i.e., in the fields where the use of a pressure-sensitive adhesive sheet containing a silicone is liable to cause problems. In addition, if the peelable liner is one composed of a simple film material such as polyethylene and polypropylene, there is an advantage that the peelable liner is excellent in recycling property of plastics which is regarded as problematic recently.

Examples of the peelable liner which is not subjected to a silicone treatment include polyolefin series films such as those made of polyethylene, polypropylene, an ethylene-propylene copolymer (block or random copolymer) or a mixture thereof and films having provided on the surface polyolefin such as those described above, i.e., polyethylene, polypropylene, an ethylene-propylene copolymer (black or random copolymer) or a mixture thereof. Examples of the film having polyolefin on the surface includes a paper or other film laminated with the polyolefin series film and a film having polyolefin located thereon in a dot-like or line-like state.

Furthermore, a pressure-sensitive adhesive sheet not having a peelable liner can be prepared by forming a layer made of the pressure-sensitive adhesive of the present invention (with the thickness described above) on one surface of a base material and constituting at least the back surface side of the base material with polyolefin such as polyethylene, polypropylene, an ethylene-polypropylene copolymer (block or random copolymer) or a mixture thereof.

The pressure-sensitive adhesive sheets of this kind have a feature that the back surface side of the base material is not subjected to a silicone treatment but the peeling property of the layer made up of the pressure-sensitive adhesive to the back surface of the sheet (back surface of the base material) is good, thereby enabling the pressure-sensitive adhesive sheet to be rolled in a roll form without using a peelable liner. Because this the pressure-sensitive adhesive sheet has a base material of which back surface is not required to be treated with a silicone compound and does not have a peeling liner, it can be advantageously used for computer instruments etc. as a pressure-sensitive adhesive sheet not containing a silicone compound substantially. As long as anchor ability between the layer composed of the pressure-sensitive adhesive composition and the base material is ensured, not only the back surface side of each base material but also the whole base material may be made up of polyolefin such as those described above.

The following examples are intended to illustrate the present invention in more detail but not to limit the scope of the present invention in any way. In addition, all parts, in these examples, are by weight.

EXAMPLE 1

In a four-neck separable flask equipped with a stirrer, a thermometer, and a water separating pipe were placed 200 g of polycaprolactonediol (PLACCEL L212AL, trade name, made by DAICEL CHEMICAL INDUSTRIES, LTD., hydroxy group value: 89.4 KOH mg/g), 15.95 g of succinic anhydride, and 79 mg of dibutyltin oxide (DBTO) as a catalyst, the temperature of the mixture was raised to 180° C. with stirring in the presence of a small amount of toluene as a reaction water discharging solvent and the resultant mixture was kept at the temperature. After a while, the outflow and separation of water were observed and the reaction began to proceed. Then, by continuing the reaction for about 30 hours, a polyester having a weight average molecular weight of 65,000 was obtained.

The polyester was diluted with toluene to a solid component concentration of 50% by weight. By adding 2.5 parts (solid components) of the hexamethylene diisocyanate addition product of trimethylolpropane (Coronate HL, trade name, made by NIPPON POLYURETHANE INDUSTRY CO., LTD.) as a crosslinking agent to 100 parts (solid components) of the polyester, a pressure-sensitive adhesive was prepared.

The pressure-sensitive adhesive was coated on a polyethylene terephthalate film (hereinafter, is referred to as PET film) having a thickness of 38 μm using an applicator and dried at 130° C. for 3 minutes to form a pressure-sensitive adhesive layer having a thickness of 50 μm. Furthermore, by carrying out aging in an atmosphere of 50° C. for 3 days as after-cure, a pressure-sensitive sheet was prepared.

EXAMPLE 2

In a four-neck separable flask equipped with a stirrer, a thermometer, and a water separating pipe were placed 200 g of polycaprolactonediol (PLACCEL L220AL, trade name, made by DAICEL CHEMICAL INDUSTRIES, LTD., hydroxy group value: 56.6 KOH mg/g), 20.41 g of sebacic acid, and 50 mg of DBTO as a catalyst, the temperature of the mixture was raised to 180° C. with stirring in the presence of a small amount of toluene as a reaction water discharging solvent, and the resultant mixture was kept at the temperature. After a while, the outflow and separation of water were observed and the reaction began to proceed. Then, by continuing the reaction for about 48 hours, polyester having a weight average molecular weight of 63,000 was obtained.

The polyester was diluted with toluene to a solid component concentration of 50% by weight. By adding 2.5 parts (solid components) of the hexamethylene diisocyanate addition product of trimethylolpropane (Coronate HL, trade name, made by NIPPON POLYURETHANE INDUSTRY CO., LTD.) as a crosslinking agent to 100 parts (solid components) of the polyester, a pressure-sensitive adhesive was prepared.

The pressure-sensitive adhesive was coated on a PET film having a thickness of 38 μm using an applicator and dried at 130° C. for 3 minutes to form a pressure-sensitive adhesive layer having a thickness of 50 μm. Furthermore, by carrying out aging in an atmosphere of 50° C. for 3 days as after-cure, a pressure-sensitive adhesive sheet was prepared.

EXAMPLE 3

In a four-neck separable flask equipped with a stirrer, a thermometer, and a water separating pipe were placed 300 g of polycaprolactonediol (PLACCEL L220PL, trade name, made by DAICEL CHEMICAL INDUSTRIES, LTD., hydroxy group value: 55.9 KOH mg/g), 30.5 g of sebacic acid, and 150 mg of DBTO as a catalyst, the temperature of the mixture was raised to 180° C. with stirring in the presence of a small amount of toluene as a reaction water discharging solvent, and the resultant mixture was kept at the temperature. After a while, the outflow and separation of water were observed and the reaction began to proceed. Then, by continuing the reaction for about 44 hours, a polyester having a weight average molecular weight of 71,000 was obtained.

The polyester was diluted with toluene to a solid component concentration of 50% by weight. By adding 2 parts (solid components) of the hexamethylene diisocyanate addition product of trimethylolpropane (Coronate HL, trade name, made by NIPPON POLYURETHANE INDUSTRY CO., LTD.) as a crosslinking agent to 100 parts (solid components) of the polyester, a pressure-sensitive adhesive was prepared.

The pressure-sensitive adhesive was coated on a PET film having a thickness of 38 μm using an applicator and dried at 130° C. for 3 minutes to form a pressure-sensitive adhesive layer having a thickness of 50 μm. Furthermore, by carrying out aging in an atmosphere of 50° C. for 3 days as after-cure, a pressure-sensitive adhesive sheet was prepared.

EXAMPLE 4

By following the same procedure as Example 3 except that 2 parts (solid components) of the tolylene diisocyanate addition product of trimethylolpropane (Coronate L, trade name, made by NIPPON POLYURETHANE INDUSTRY CO., LTD.) was used in place of polycaprolactonediol, a pressure-sensitive adhesive was prepared. Also, using the pressure-sensitive adhesive, a pressure-sensitive adhesive sheet was prepared by the same manner as in Example 3.

EXAMPLE 5

In a four-neck separable flask equipped with a stirrer, a thermometer, and a water separating pipe were placed 210 g of polycaprolactonediol (PLACCEL L220PL, trade name, made by DAICEL CHEMICAL INDUSTRIES, LTD., hydroxy group value: 57.3 KOH mg/g), 140 g of polycarbonate diol (PLACCEL CD220PL. trade name, made by DAICEL CHEMICAL INDUSTRIES, LTD., hydroxy group value: 57.3 KOH mg/g), and 18.5 g of succinic anhydride, the temperature of the mixture was raised to 180° C. with stirring in the presence of a small amount of toluene as a reaction water discharging solvent, and the resultant mixture was kept at the temperature. After a while, the outflow and separation of water were observed and the reaction began to proceed. Then, by continuing the reaction for about 50 hours, a polyester having a weight average molecular weight of 46,000 was obtained.

The polyester was diluted with toluene to a solid component concentration of 50% by weight. Then, by adding 4 parts (solid components) of the hexamethylene diisocyanate addition product of trimethylol propane (Coronate HL, trade name, made by NIPPON POLYURETHANE INDUSTRY CO., LTD.) as a crosslinking agent to 100 parts (solid components) of the polyester, a pressure-sensitive adhesive was prepared.

The pressure-sensitive adhesive was coated on a PET film having a thickness of 38 μm using an applicator and dried at 130° C. for 3 minutes to form a pressure-sensitive adhesive layer having a thickness of 50 μm. Furthermore, by carrying out aging in an atmosphere of 50° C. for 3 days as after-cure, a pressure-sensitive adhesive sheet was prepared.

EXAMPLE 6

By following the same procedure as Example 1 except that before carrying out after-cure, a peelable liner made up of a polypropylene/polyethylene blend film having a thickness of 40 μm was stuck to the pressure-sensitive adhesive surface and thereafter after-cure was carried out, a pressure-sensitive adhesive sheet was prepared.

EXAMPLE 7

By following the same procedure as Example 2 except that before carrying out after-cure, a peelable liner made up of a polyethylene film having a thickness of 60 μm was stuck to the pressure-sensitive adhesive surface and thereafter after-cure was carried out, a pressure-sensitive adhesive sheet was prepared.

EXAMPLE 8

By following the same procedure as Example 3 except that before carrying out after-cure, a peelable liner made up of a polyethylene film having a thickness of 60 μm was stuck to the pressure-sensitive adhesive surface and thereafter after-cure was carried out, a pressure-sensitive adhesive sheet was prepared.

EXAMPLE 9

By following the same procedure as Example 4 except that before carrying out after-cure, a peelable liner made up of a polypropylene film having a thickness of 40 μm was stuck to the pressure-sensitive adhesive surface and thereafter after-cure was carried out, a pressure-sensitive adhesive sheet was prepared.

EXAMPLE 10

By following the same procedure as Example 5 except that before carrying out after-cure, a peelable liner made up of a polyethylene film having a thickness of 60 μm was stuck to the pressure-sensitive adhesive surface and thereafter after-cure was carried out, a pressure-sensitive adhesive sheet was prepared.

Comparative Example 1

A solution of a mixture obtained by adding 150 parts of toluene and 0.1 part of azobisisobutyronitrile to a monomer mixture of 92 parts of butyl acrylate and 8 parts of acrylic acid was solution-polymerized in a nitrogen gas atmosphere at 60° C. for about 7 hours to provide a polymer solution. By adding 2.0 parts (solid components) of the tolylene diisocyanate addition product of trimethylolpropane (Coronate L, trade name, made by NIPPON POLYURETHANE INDUSTRY CO., LTD.) as a crosslinking agent to 100 parts (solid components) of the polymer solution obtained above, a pressure-sensitive adhesive was prepared.

The pressure-sensitive adhesive was coated on a PET film having a thickness of 38 μm using an applicator and dried at 120° C. for 5 minutes to form a pressure-sensitive adhesive layer having a thickness of 50 μm. Furthermore, by sticking a peelable liner made up of a polypropylene/polyethylene blend film having a thickness of 40 μm to the pressure-sensitive adhesive surface, a pressure-sensitive adhesive sheet was prepared.

Comparative Example 2

In 150 parts of toluene were dissolved 100 parts of a natural rubber, 100 parts of an aliphatic series petroleum resin (softening point 100° C.), and 20 parts of a softening agent (polybutene) and then by adding thereto 1.5 parts of the tolylene diisocyanate addition product of trimethylolpropane (Coronate L, trade name, made by NIPPON POLYURETHANE INDUSTRY CO., LTD.) as a crosslinking agent, a pressure-sensitive adhesive was prepared.

The pressure-sensitive adhesive was coated on a PET film having a thickness of 38 μm using an applicator and dried at 100° C. for 5 minutes to form a pressure-sensitive adhesive layer having a thickness of 50 μm. Furthermore, by sticking a peelable liner made up of a polyethylene film having a thickness of 60 μm to the pressure-sensitive adhesive surface, a pressure-sensitive adhesive sheet was prepared.

About each of the pressure-sensitive adhesive sheets prepared in Examples 1 to 5 and Comparative Examples 1 and 2 described above, the pressure-sensitive adhesive force and the heat resistance were determined by the following methods. These test results are shown in Table 1 below together with the solvent-insoluble component ratio of each of the polymers. In addition, the solvent-insoluble component ratio of the polymer was measured and calculated by the following method.

Measurement of Solvent-Insoluble Component Ratio

About 0.1 g of the pressure-sensitive adhesive was sampled from each pressure-sensitive adhesive sheet and accurately weighed (W1). After immersing the sample in about 50 ml of toluene at room temperature for 5 days, a solvent-insoluble components were taken out and after drying at 130° C. for about one hour, weighed (W2). The solvent-insoluble component ratio (X) was calculated as follows;

$$X(\text{weight \%}) = (W2/W1) \times 100.$$

Measurement of Pressure-Sensitive Adhesive Force

Each pressure-sensitive adhesive sheet was stuck to a stainless steel plate (SUS304) or a polycarbonate plate as an adherend and 180° releasing pressure-sensitive adhesive force was measured under the conditions of an atmospheric temperature of 23° C., a stuck time of 30 minutes, and a peeling rate of 300 mm/minutes.

Measurement of Heat Resistance

Each pressure-sensitive adhesive sheet was stuck to a Bakelite plate with the adhered area being 1 cm in width and 2 cm in length, a load of 500 g per 2 cm² of the adhered area was applied in the longitudinal direction at an atmospheric temperature of 80° C., and the retention time until the sheet was fallen was determined.

TABLE 1

|  | Solvent-insoluble Component Ratio (wt. %) | Pressure-Sensitive Adhesive Force (kg/20 mm-width) | | Heat Resistance (minute)* |
|---|---|---|---|---|
|  |  | Stainless Steel Plate | Polycarbonate plate |  |
| Example 1 | 47 | 1.5 | 1.4 | >120 |
| Example 2 | 38 | 1.8 | 1.6 | >120 |
| Example 3 | 29 | 2.7 | 2.1 | >120 |
| Example 4 | 24 | 3.1 | 2.2 | >120 |
| Example 5 | 31 | 2.1 | 2.3 | >120 |
| Comparative Example 1 | 45 | 1.2 | 1.1 | >120 |
| Comparative Example 2 | 13 | 1.3 | 1.2 | 3 |

*Retention time

As is clear from the results shown in Table 1 above, it can be seen that each of the pressure-sensitive adhesive sheets obtained in Examples 1 to 5 of the present invention had a good pressure-sensitive adhesive force and also was excellent in the heat resistance as compared with the pressure-sensitive adhesive sheets obtained in Comparative Examples 1 and 2.

Then, each of the pressure-sensitive adhesive sheets obtained in Examples 6 to 10 and Comparative Examples 1 and 2 was evaluated in terms of the peeling property of the peelable liner and the pressure-sensitive adhesive force after peeling the peelable liner by the following methods.

The results are shown in Table 2 below.

Measurement of Peeling Property

The peelable liner was peeled from each pressure-sensitive adhesive sheet by an Instron type tension tester under the conditions of an atmospheric temperature of 23° C., a peeling angle of 180°, and a peeling rate of 300 mm/minute and the peeling force in this case was measured.

Measurement of Pressure-Sensitive Adhesive Force

After peeling the peelable liner, each pressure-sensitive adhesive sheet was stuck to an aluminum plate as an adherend, and the 180° releasing pressure-sensitive adhesive force was measured under the conditions of an atmospheric temperature of 23° C., a stuck time of 30 minutes and a peeling rate of 300 mm/minute.

TABLE 2

|  | Peeling Property (g/50 mm-width) | Pressure-Sensitive Adhesive Force* (kg/20 mm-width) |
|---|---|---|
| Example 6 | 15 | 1.6 |
| Example 7 | 20 | 1.3 |
| Example 8 | 45 | 1.2 |
| Example 9 | 15 | 1.3 |
| Example 10 | 15 | 1.8 |
| Comparative | 900 | 1.1 |

TABLE 2-continued

|  | Peeling Property (g/50 mm-width) | Pressure-Sensitive Adhesive Force* (kg/20 mm-width) |
|---|---|---|
| Example 1 |  |  |
| Comparative Example 2 | 800 | 1.2 |

*To aluminum plate

As is clear from the results shown in Table 2 above, it can be seen that each of the pressure-sensitive adhesive sheets of the present invention obtained in Examples 6 to 10 showed a less peeling force of the peelable liner, was excellent in the peeling property in spite of that the peelable liner was not subjected to a silicone treatment, and kept a good pressure-sensitive adhesive force.

On the other hand, in the pressure-sensitive adhesive sheets obtained in Comparative Examples 1 and 2, the peeling force of the above-described peelable liner was very large and peeling was difficult, and thus for improving the peeling property, the use of the peelable liner subjected to a silicone treatment become inevitable.

As described above, the present invention can provide a pressure-sensitive adhesive composition excellent in the pressure-sensitive adhesive property and the heat resistance by using the polymer having the polylactone structure as the main chain. Also, in the pressure-sensitive adhesive sheets of the present invention having the layer of the pressure-sensitive adhesive composition, when a polyolefin series film, etc., which are not subjected to silicone treatment is stuck to the pressure-sensitive adhesive surface as a peelable liner, a good peeling property is obtained. Furthermore, in place of using the peelable liner, the back surface side of the base material of the pressure-sensitive adhesive sheet is made up of a polyolefin, etc., a pressure-sensitive adhesive sheet excellent in the peeling property from the back surface thereof can be obtained without treating the back surface of the base material with a silicone. These pressure-sensitive adhesive sheets of the present invention can be advantageously used for computer instruments, wherein the content of a silicone is liable to cause a problem, as pressure-sensitive adhesive sheets containing no silicone.

While the invention has been described in detail and with reference to specific examples thereof, it will be apparent to one skilled in the art that various changes and modifications can be made therein without departing from the spirit and scope thereof.

What is claimed is:

1. A pressure-sensitive adhesive composition comprising a polymer having a polylactone structure comprising a unit represented by the following formula repeatedly as the main chain:

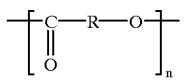

wherein R represents a straight-chain or branched hydrocarbon group having from 3 to 15 carbon atoms, and n is selected from appropriate repeating numbers such that the weight average molecular weight of the whole polymer becomes at least 10,000, wherein the polymer having the polylactone structure as the main chain is a polyester having a weight average molecular weight of at least 10,000 and is made up of a polyester prepared from;

a diol component comprising polycaprolactonediol, and a dicarboxylic acid component comprising a dicarboxylic acid having an aliphatic or alicyclic hydrocarbon group having from 2 to 20 carbon atoms as the molecular skeleton.

2. The pressure-sensitive adhesive composition of claim 1, wherein the polymer having the polylactone structure as the main chain is subjected to a crosslinking treatment of reacting the polymer with a polyfunctional compound and the solvent-insoluble component ratio of the crosslinked polymer is at least 10% by weight.

3. A single-layered or multi-layered pressure-sensitive adhesive sheet having a layer composed of a pressure-sensitive adhesive composition comprising a polymer having a polylactone structure comprising a unit represented by the following formula repeatedly as the main chain:

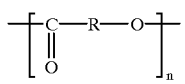

wherein R represents a straight-chain or branched hydrocarbon group having from 3 to 15 carbon atoms, and n is selected from appropriate repeating numbers such that the weight average molecular weight of the whole polymer becomes at least 10,000, wherein the polymer having the polylactone structure as the main chain is a polyester having a weight average molecular weight of at least 10,000 and is made up of a polyester prepared from:

a diol component comprising polycaprolactonediol, and a dicarboxylic acid component comprising a dicarboxylic acid having an aliphatic or alicyclic hydrocarbon group having from 2 to 20 carbon atoms as the molecular skeleton.

4. The pressure-sensitive adhesive sheet of claim 3, wherein the polymer having the polylactone structure as the main chain is subjected to a crosslinking treatment of reacting the polymer with a polyfunctional compound and the solvent-insoluble component ratio of the crosslinked polymer is at least 10% by weight.

5. The pressure-sensitive adhesive sheet of claim 3, wherein the layer composed of the pressure-sensitive adhesive composition is formed on one surface or both surfaces of a base material.

6. A pressure-sensitive adhesive sheet having a layer composed of a pressure-sensitive adhesive composition comprising a polymer having a polylactone structure comprising a unit represented by the following formula repeatedly as the main chain:

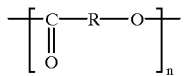

wherein R represents a straight-chain or branched hydrocarbon group having from 3 to 15 carbon atoms, and n is selected from appropriate repeating numbers such that the weight average molecular weight of the whole polymer becomes at least 10,000, wherein the polymer having the polylactone structure as the main chain is a polyester having a weight average molecular weight of at least 10,000 and is made up of a polyester prepared from:

a diol component comprising polycaprolactonediol, and a dicarboxylic acid component comprising a dicarboxylic acid having an aliphatic or alicyclic hydrocarbon group having from 2 to 20 carbon atoms as the molecular skeleton, wherein a peelable liner which is not subjected to a silicone treatment is stuck to the layer composed of the pressure-sensitive adhesive composition.

7. The pressure-sensitive adhesive sheet of claim 6, wherein the peelable liner which is not subjected to a silicone treatment is a polyolefin series film made up of polyethylene, polypropylene, an ethylene-propylene copolymer or a mixture thereof, or a film having provided on the surface polyethylene, polypropylene, an ethylene-propylene copolymer or a mixture thereof, and the peeling force of the peelable liner is 200 g/50 mm-width or lower.

8. A pressure-sensitive adhesive sheet, having a layer composed of a pressure-sensitive adhesive composition comprising a polymer having a polylactone structure comprising a unit represented by the following formula repeatedly as the main chain:

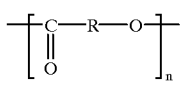

wherein R represents a straight-chain or branched hydrocarbon group having from 3 to 15 carbon atoms, and n is selected from appropriate repeating numbers such that the weight average molecular weight of the whole polymer becomes at least 10,000, wherein the polymer having the polylactone structure as the main chain is a Polyester having a weight average molecular weight of at least 10,000 and is made up of a polyester prepared from:

a diol component comprising polycaprolactonediol, and a dicarboxylic acid component comprising a dicarboxylic acid having an aliphatic or alicyclic hydrocarbon group having from 2 to 20 carbon atoms as the molecular skeleton, wherein the layer composed of the pressure-sensitive adhesive composition is formed on one surface or both surfaces of a base material, and wherein a peelable liner which is not subjected to a silicone treatment is stuck to the layer composed of the pressure-sensitive adhesive composition.

9. The pressure-sensitive adhesive sheet of claim 8, wherein the peelable liner which is not subjected to a silicone treatment is a polyolefin series film made up of polyethylene, polypropylene, an ethylene-propylene copolymer or a mixture thereof, or a film having provided on the surface polyethylene, polypropylene, an ethylene-propylene copolymer or a mixture thereof, and the peeling force of the peelable liner is 200 g/50 mm-width or lower.

10. A pressure-sensitive adhesive sheet having a layer composed of a pressure-sensitive adhesive composition comprising a polymer having a polylactone structure comprising a unit represented by the following formula repeatedly as the main chain:

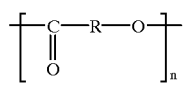

wherein R represents a straight-chain or branched hydrocarbon group having from 3 to 15 carbon atoms, and n is selected from appropriate repeating numbers such that the weight average molecular weight of the whole polymer becomes at least 10,000, wherein the polymer having the polylactone structure as the main chain is a polyester having a weight average molecular weight of at least 10,000 and is made up of a polyester prepared from:

a diol component comprising polycaprolactonediol, and a dicarboxylic acid component comprising a dicarboxylic acid having an aliphatic or alicyclic hydrocarbon group having from 2 to 20 carbon atoms as the molecular skeleton, wherein the layer composed of the pressure-sensitive adhesive composition is formed on one surface of a base material, the back surface side of the base material is not subjected to a silicone treatment, and said pressure-sensitive adhesive sheet is rolled in a roll form without using a peelable liner.

11. The pressure-sensitive adhesive sheet of claim 10, wherein at least the back surface side of the base material is made up of a polyolefin selected from polyethylene, polypropylene, an ethylene-propylene copolymer, or a mixture thereof.

* * * * *